No. 808,260. PATENTED DEC. 26, 1905.
J. A. STANSBURY.
KNIFE SHARPENING MACHINE.
APPLICATION FILED JUNE 6, 1905.
7 SHEETS—SHEET 6.
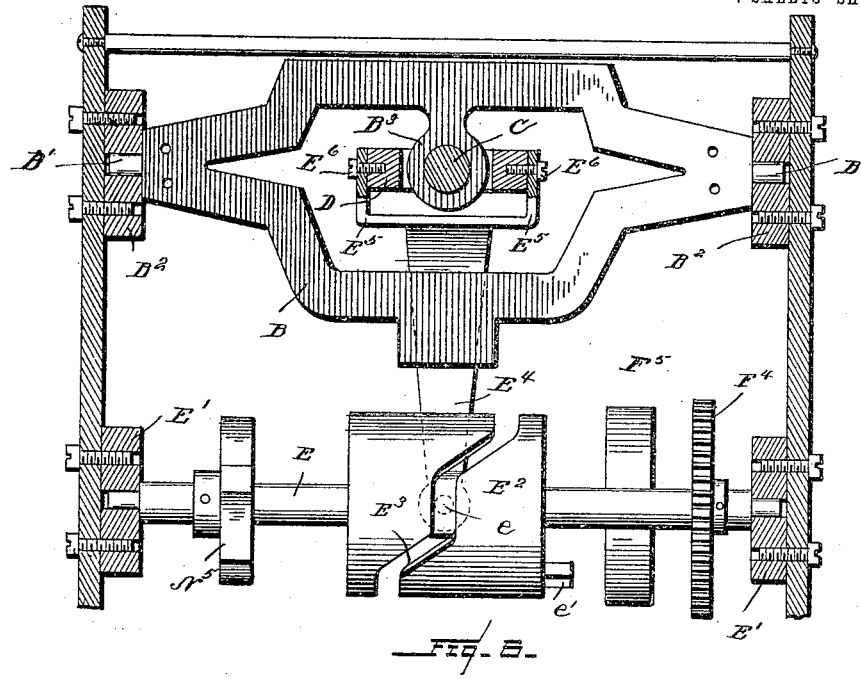
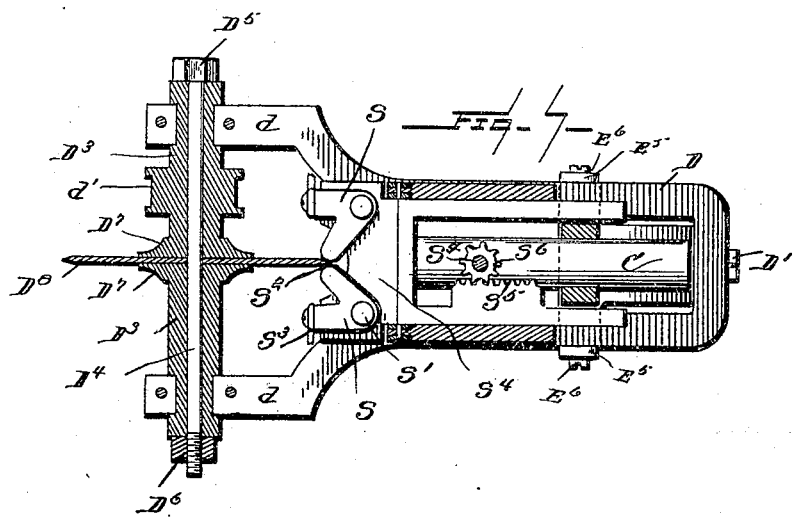
WITNESSES:
INVENTOR
Joseph A. Stansbury.
By Franklin N. Hough
Attorney

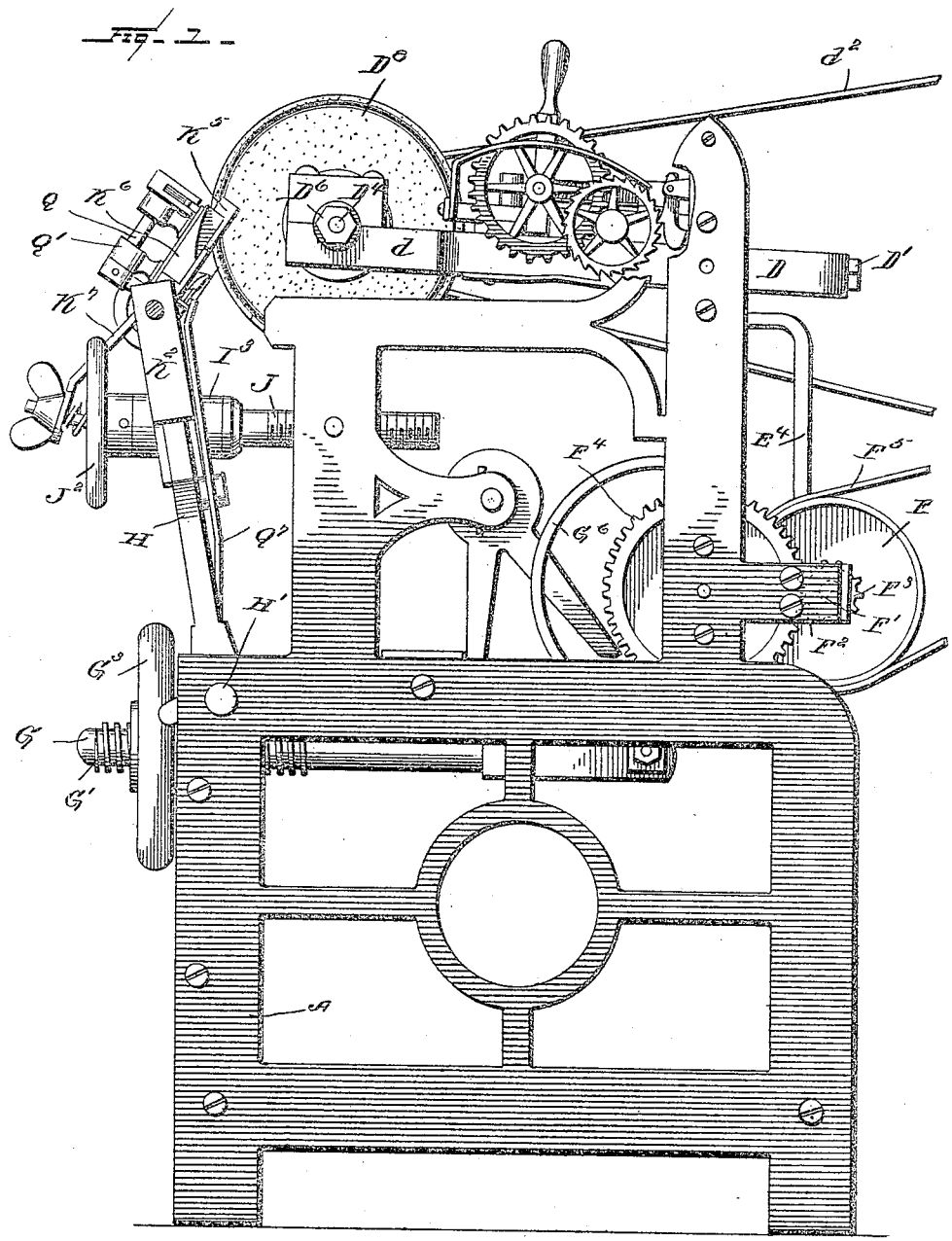

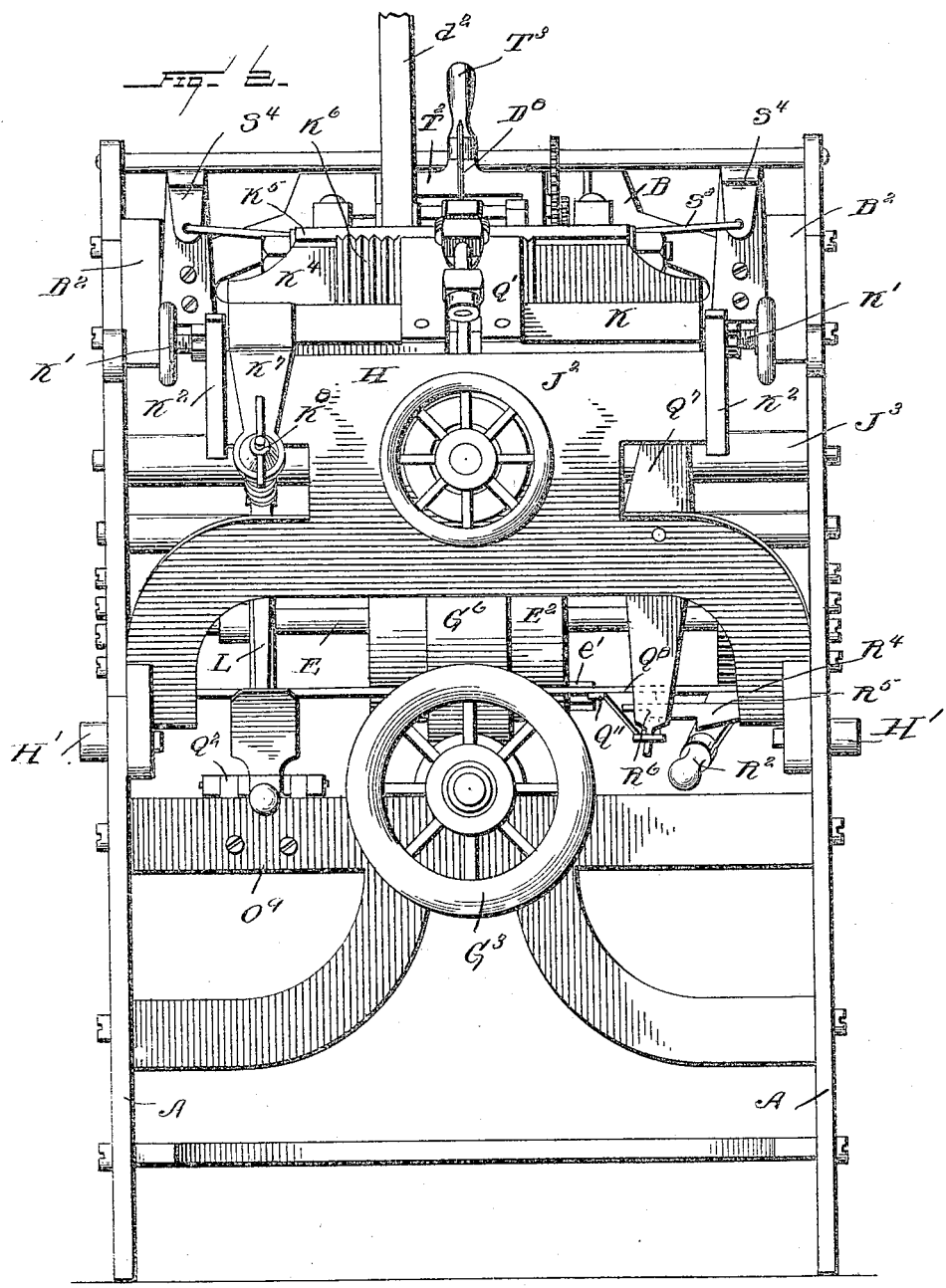

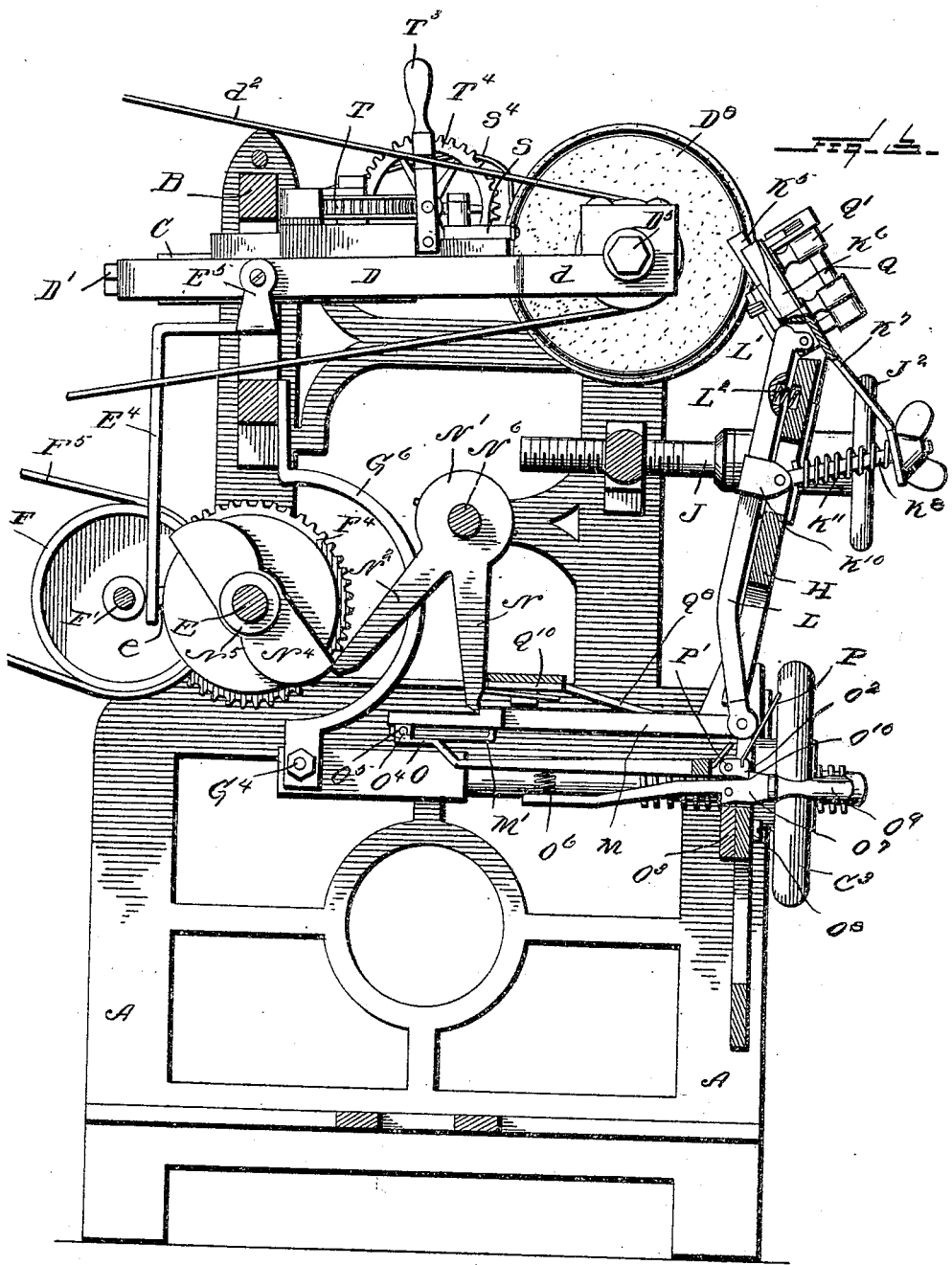

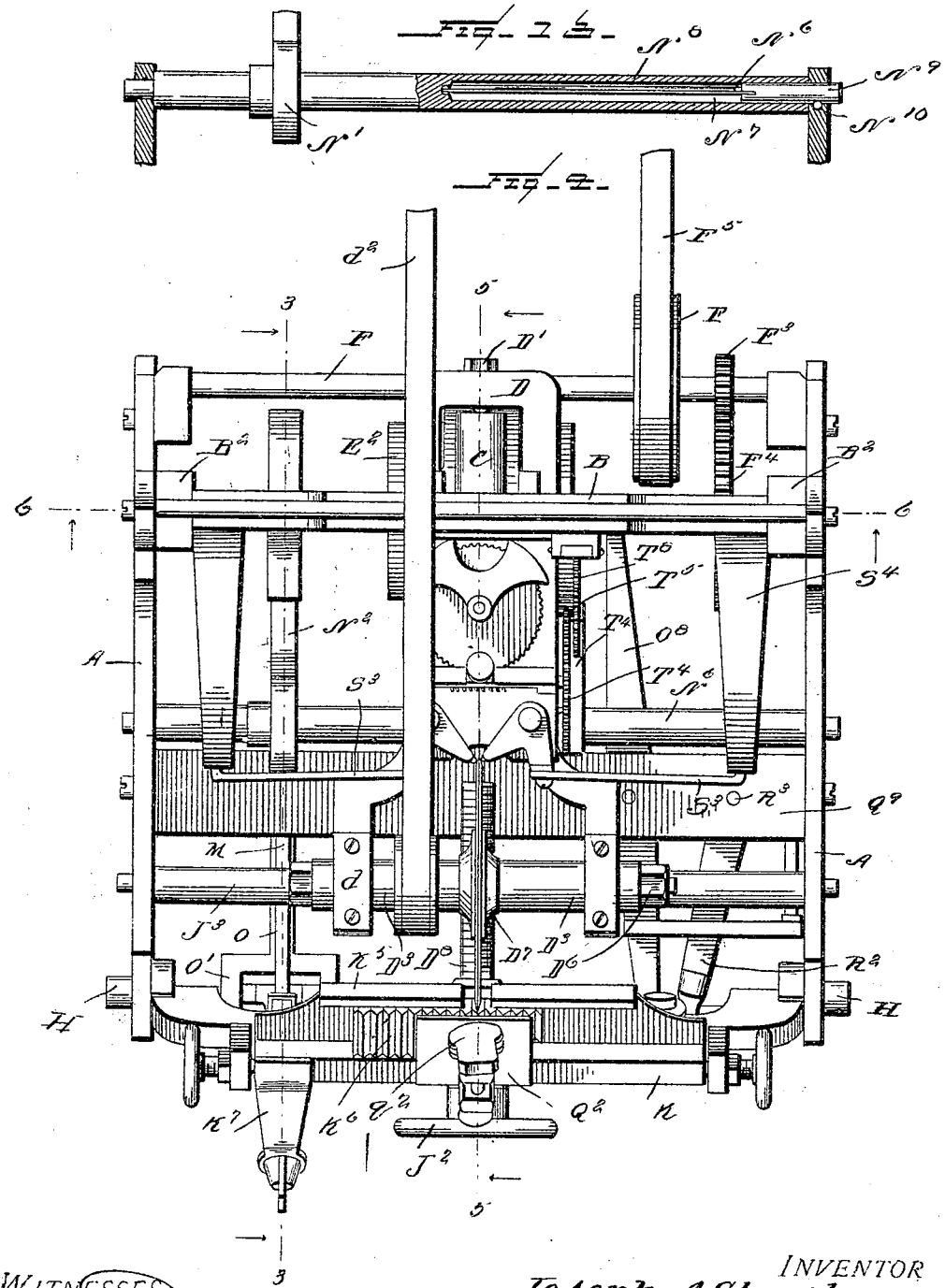

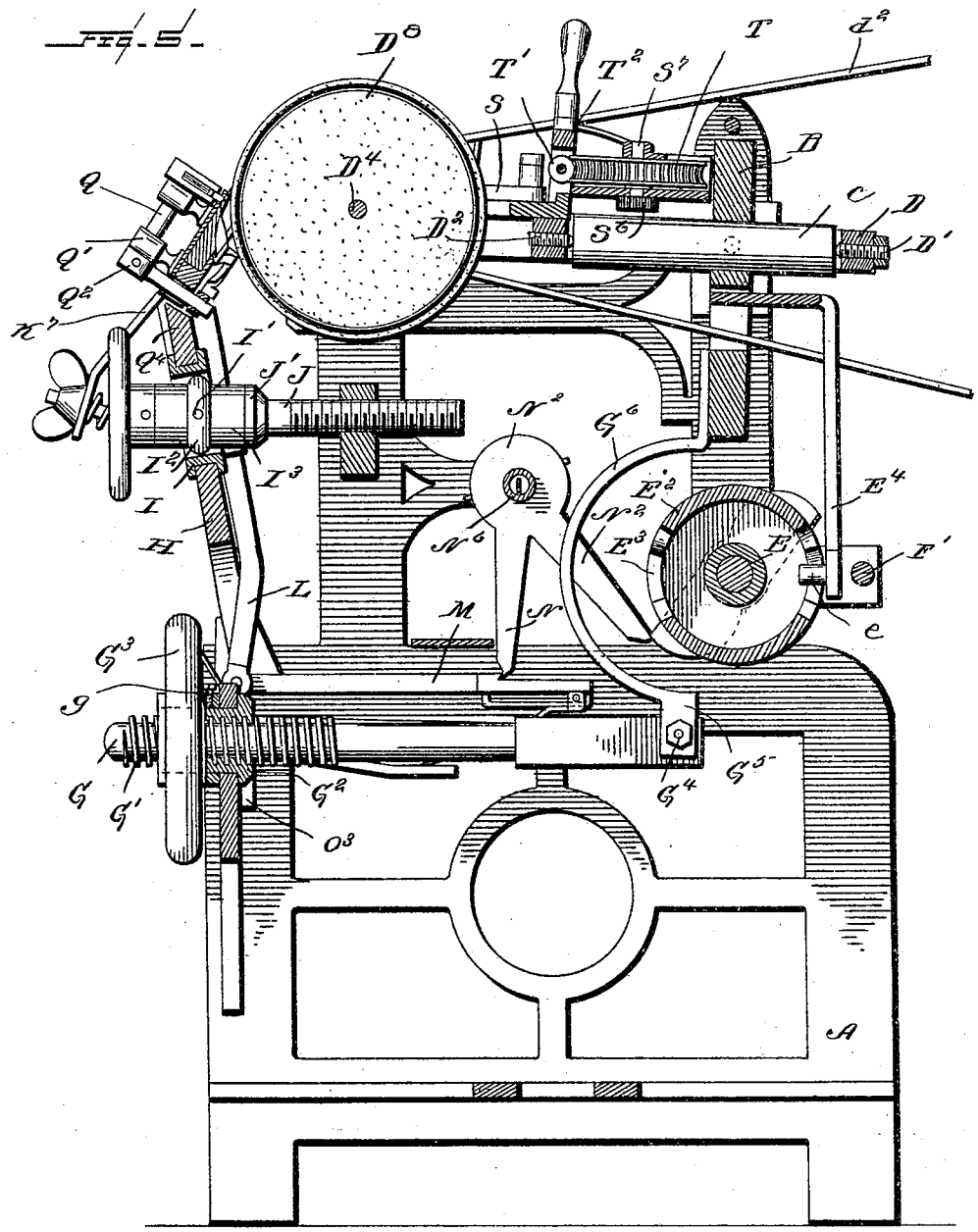

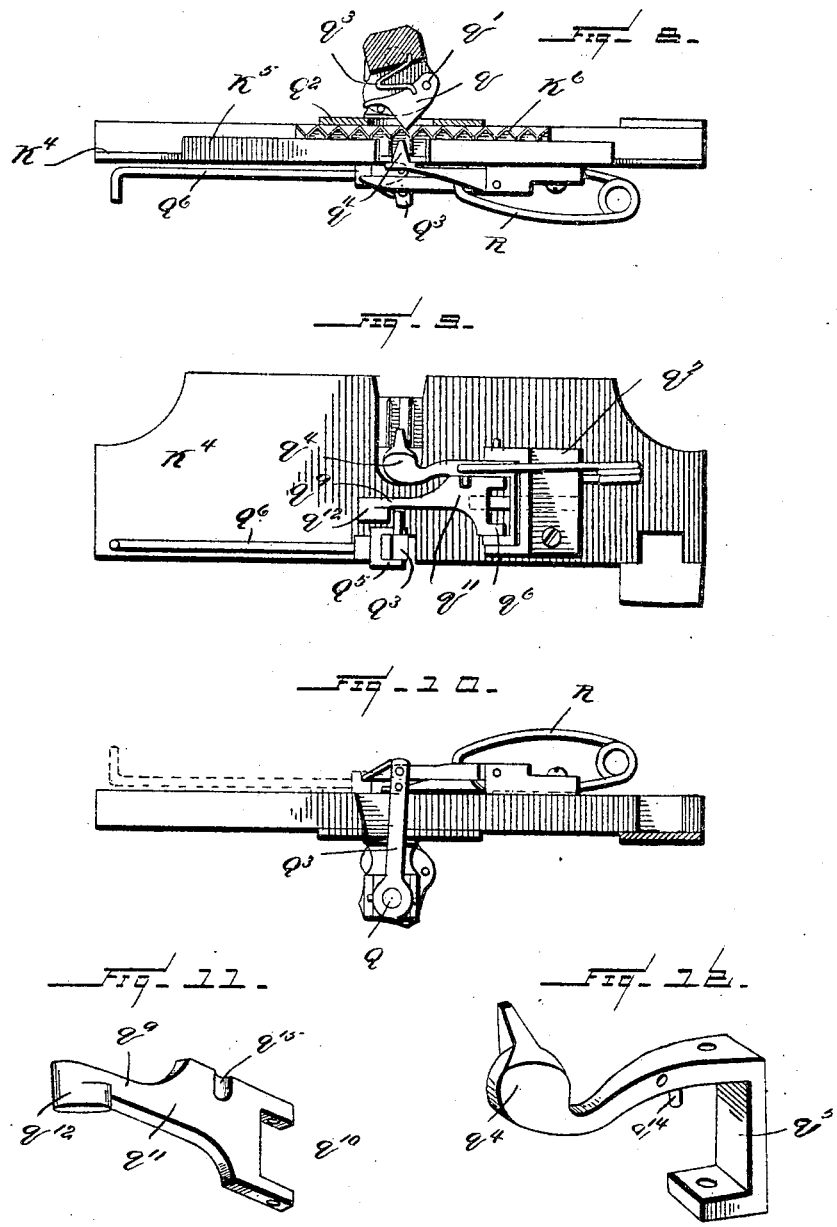

UNITED STATES PATENT OFFICE.

JOSEPH A. STANSBURY, OF LOS ANGELES, CALIFORNIA.

KNIFE-SHARPENING MACHINE.

No. 808,260.  Specification of Letters Patent.  Patented Dec. 26, 1905.

Application filed June 6, 1905. Serial No. 263,998.

*To all whom it may concern:*

Be it known that I, JOSEPH A. STANSBURY, a citizen of the United States, residing at Los Angeles, in the county of Los Angeles and State of California, have invented certain new and useful Improvements in Knife-Sharpening Machines; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in apparatus for sharpening knives; and the object of the invention is to produce a simple and efficient means especially adapted for the grinding of beet-shredding knives having a fluted cutting edge, and comprises means whereby the angle at which the knife is held may be adjusted so that the grinding-disk may be held in contact with the inclined edges of the cutting-knife.

The invention consists, further, in the provision of an adjusting means whereby the grinding of the parallel cutting edges of the knife may be regulated independent of the regulating mechanism for adjusting the knife to grind the angled edges of the cutting edge.

Another object of the invention is to produce an automatic means for truing the edge of the cutting-disk in order to adapt the same for grinding accurately the angled edges of the knife.

Further features of the invention comprise various details of construction, combinations, and arrangements of parts, which will be hereinafter fully described and then specifically defined in the appended claims.

My invention is illustrated in the accompanying drawings, which, with the letters of reference marked thereon, form a part of this application, and in which drawings—

Figure 1 is a side elevation of my improved apparatus for grinding beet-shredding knives. Fig. 2 is a front elevation of the machine. Fig. 3 is a sectional view taken on line 3 3 of Fig. 4. Fig. 4 is a top plan view of the apparatus. Fig. 5 is a sectional view on line 5 5 of Fig. 4. Fig. 6 is a sectional view on line 6 6 of Fig. 4, showing parts of the apparatus in elevation. Fig. 7 is a detail sectional view through the grinding-disk and spindle holding the same, showing parts of the apparatus in top plan view. Fig. 8 is a detail sectional view through the means for feeding the knife forward. Fig. 9 is a rear elevation of the plate carrying the feeding mechanism, showing parts in elevation. Fig. 10 is an edge view of the plate holding the feeding mechanism, showing certain details of the invention. Fig. 11 is a detail view of a stop-releasing member. Fig. 12 is a detail perspective of the locking or stop member which holds the knife while being ground, and Fig. 13 is a detail sectional view through a shaft forming a part of the invention.

Reference now being had to the details of the drawings by letter, A designates the framework, in which an adjustable yoke B, having spindle ends B', is mounted in suitable bearing-blocks $B^2$. (Shown clearly in Fig. 6 of the drawings.) Said yoke has an adjustable rocking movement actuated by mechanism which will be presently described for the purpose of regulating the grinding of the opposite parallel portions of the beet-shredding blade, and depending from the upper portion of said yoke is an apertured lug $B^3$, carrying the shaft C. (Shown in section in Fig. 6 and in side elevation in Fig. 5 of the drawings.) Said shaft C supports the rocking yoke D, carrying the screws D' and $D^2$, each of which has its inner end pointed and engaging an indenture as a bearing in the opposite ends of said shaft. The forward end of the yoke D is forked, having the arms $d$, each of which has journaled therein a shell $D^3$, which is centrally apertured to receive a threaded rod $D^4$, having a head $D^5$ at one end and a nut $D^6$ at its opposite end, whereby the two shells may be held in alinement, with their inner clamping ends $D^7$ for engagement with the opposite faces of the grinding-disk $D^8$ when the latter is mounted upon the rod, as shown in Fig. 7 of the drawings. By the provision of this manner of mounting the grinding-disk it will be seen that the latter may be easily and quickly removed by simply removing the nut $D^6$ and withdrawing the rod $D^4$. By the provision of the means described for holding the grinding-wheel it will not be necessary to remove the shells $D^3$ from their bearings upon the arms of said yoke.

E designates a shaft mounted in bearings E' upon the frame of the apparatus, and $E^2$ designates a cylinder fixed to rotate with the shaft E, which has an irregular-shaped cam-groove $E^3$ formed in the circumference thereof, and $E^4$ designates a lever, the upper end of which is bifurcated, forming the arms $E^5$, each of which carries a screw $E^6$, which engage the opposite parallel portions of the yoke D, as shown clearly in the several views of the drawings. The lower end of the lever $E^4$ carries a lug $e$, (shown clearly in Fig. 5 of the drawings,) and said lug is adapted to travel in the irregular-outlined cam-groove $E^3$ as the shaft E rotates, for the purpose of rocking the lever $E^4$ and also the yoke D, which is connected thereto, thereby tilting the grinding-disk for the purpose of grinding the opposite parallel and angled edges of the knife.

A pulley $d'$ is fixed to one of the shells $D^3$ and has a belt $d^2$ passing over the same, as shown in Figs. 1 and 5 of the drawings, and which may be driven by any suitable power.

Referring to Fig. 1 of the drawings will be seen a pulley F, which is mounted upon a counter-shaft $F'$, journaled in the bracket-arms $F^2$ of the frame, and $F^3$ is a pinion-wheel, which is in mesh with a gear-wheel $F^4$, fixed to the shaft E, (shown clearly in Fig. 6 of the drawings,) whereby a rotary movement may be imparted to the latter. The pulley F has a belt $F^5$ passing about the same, which may also be connected to any suitable supply of power (not shown) and so adjusted in connection with the belt running the grinding-disk to give the proper relative speed to the disk and the cylinder having the cam-groove $E^3$ therein.

In order to adjust the yoke D for the purpose of regulating the grinding of the opposite parallel portions of the edge of the shredding-knife, I provide a shaft G, having a threaded portion $G'$, which is mounted in an interiorly threaded and swiveled thimble $G^2$, (shown clearly in Fig. 5 of the drawings,) and $G^3$ designates a hand-wheel, the hub portion of which carries a set-screw $g$, designed to engage the threads of the swiveled thimble $G^2$, whereby as the wheel and thimble may be turned together as the screw is rotated a longitudinal movement may be imparted to the shaft G. The inner end of the shaft G is pivotally connected to a threaded pin $G^4$, carried by the arms $G^5$ at the lower end of the semicircular-shaped bar $G^6$, which is fastened to the yoke B. By this adjusting-shaft G it will be observed that as the wheel is turned in one direction or the other the yoke will be rocked forward or backward, and with it the grinding-disk may be raised or lowered.

H designates a rack having stub-shafts $H'$ at the ends thereof, which are mounted in suitable bearings in the opposite walls of the frame of the apparatus, and said rack has an aperture formed therein in which is positioned the flanged ring I. (Shown in Fig. 5 of the drawings.)

$I'$ designates pivotal pins projecting from the beading $I^2$ about a shell $I^3$, thereby providing means whereby said shell may be rocked upon the pivot-pins $I'$, and swiveled within the shell $I^3$ is a screw J, having an integral collar $J'$ thereon bearing against one end of the shell $I^3$, and the outer end of said screw has an adjusting-wheel $J^2$ fixed thereto.

$J^3$ designates a shaft the ends of which are journaled in the frame of the apparatus, and through which shaft $J^3$ the threaded shaft J passes.

K designates a rock-shaft the ends of which are pivotally mounted upon the inner ends of the adjusting-screws $K'$, (shown clearly in Fig. 2 of the drawings,) said screws being held in strips $K^2$, which may be integral with or fastened to the rack H. Said rock-shaft K has secured thereto a plate $K^4$, the upper edge of which has a flange $K^5$, and against which plate the knife to be sharpened, $K^6$, is adapted to contact while the lower edge of the knife rests upon the rock-shaft K.

$K^7$ designates an arm which is fastened to the rock-shaft K, and its lower end, which is apertured, receives a screw $K^8$, which is pivotally connected at its inner end to a strap or clevis $K^{10}$. (Shown in Fig. 3 of the drawings.)

$K^{11}$ designates a spring interposed between the arm $K^7$ and the strap or clevis $K^{10}$ and serves to yieldingly bear against the arm $K^7$. Said strap $K^{10}$ is fastened to a lever L, the upper end of which is pivotally connected at $L'$ to the plate carrying said knife, and a spring $L^2$ is interposed between the rack H and said lever L, as shown in the cut-away sectional portion in Fig. 3 of the drawings, thereby forming a means whereby the lever L may be normally thrown toward the driving-shaft after having been tilted forward. The lower end of the lever L is pivotally connected to a horizontally-movable bar M, having a loop $M'$ upon the under edge thereof, and the upper portion of said bar immediately over said loop is cut away, forming a shoulder $m$, against which an arm N of the disk $N'$ is adapted to contact as said disk $N'$ is rocked by means of one of the arms $N^4$ of the cam member $N^5$ coming in contact with an arm $N^2$ of the disk $N'$. (Shown clearly in Fig. 1 of the drawings.) The disk $N'$ is fixed to a shaft $N^6$, journaled in the frame of the apparatus, and the cam member $N^5$ is mounted upon the main driving-shaft E, which carries the cylinder $E^2$. By the provision of the cam $N^5$ and the disk $N'$ it will be noted that at each rotary movement of the shaft E the arm N will be tilted forward twice and the bar M will also be moved longitudinally to its outer limit twice, which will cause the plate carrying the knife to be sharpened to tilt toward the grinding-disk two times.

O designates a bar the outer end of which is bifurcated, the arms of which, $O'$, are pivotally mounted upon the arm $O^2$ of the plate $O^3$, which is fastened to the frame of the apparatus. The inner end of the bar O also has a bifurcated end with arms $O^4$, carrying a pin $O^5$, which has a play in the slot formed by the loop $M'$.

$O^6$ is a spring which is mounted upon the tilting bar $O^7$, which latter is pivotally mounted upon a pin $O^8$ in the block $O^3$, and said spring bears yieldingly against the bar O and is adapted to hold the latter and the bar M normally at their highest limits and in a position so that as the arm N rocks with its shaft said arm N will engage the shoulder upon the bar M and cause the same to be moved longitudinally toward the front of the machine. The shaft $N^6$, the detail sectional view of which is illustrated in Fig. 13 of the drawings, has a chambered portion $N^7$, in which a flat spring $N^8$ is mounted, the inner end of said spring engaging a slot in the bottom of the chambered portion, while the outer end of the spring is fastened to a gudgeon $N^9$, which is held by means of a key $N^{10}$. After the spring has been caused to be under tension by turning the gudgeon in its bearings in the frame said spring $N^8$, by the provision of the mechanism shown, will tend to return the shaft $N^6$ to its normal position after having been tilted by the cam $N^5$.

The outer end of the bar O has a handle $O^9$, and the upper edge of said bar is notched, as at $O^{10}$, and P designates a tilting catch, which is pivotally mounted at $P'$ between the arms at the outer end of the bifurcated lever or bar O and upon the plate $O^2$. Said tilting catch is adapted to engage the shoulder $O^{10}$ when it is desired to cause the bars O and M to be held in their highest positions, so that the shoulder $m$ upon the bar M will be in the path of the arm N as the disk $N'$ is rocked in one direction. When it is desired to stop the tilting movement of the plate holding the knife to be sharpened, the catch P is released from the shoulder or notch $O^{10}$ and the bar M will fall, so that the shoulder upon the upper edge thereof will be out of the path of the arm N.

The mechanism for feeding the knife forward while it is being sharpened comprises a detailed mechanism, (illustrated in Figs. 8 to 12 of the drawings,) in which Q designates a rock-shaft, (illustrated in elevation in Fig. 5 of the drawings,) and said shaft Q is mounted in suitable bearings in the lugs $Q'$, which project from the plate $Q^2$, which is fixed to the shaft K. To the lower end of the shaft Q is keyed an arm $Q^3$, the inner end of which is pivotally connected to a pin which is carried by the arms $Q^5$ at the end of a rod $Q^6$. Said rod $Q^6$ is pivotally connected to the upper end of a lever $Q^7$, (shown in Fig. 1 of the drawings,) and the lower end of said lever $Q^7$ is pivotally connected to a tilting lever $Q^8$, which is pivoted at $Q^9$ upon a cross-bar $Q^{10}$, which is fastened to the opposite walls of the frame of the apparatus. The inner end of the lever $Q^8$ has a projection $Q^{11}$, which is positioned in the path of the lug $e'$, projecting from the end of the cylinder $E^2$, (shown clearly in Fig. 6 of the drawings,) whereby at each rotary movement of said cylinder the lug $e'$ will contact with the projecting end $Q^{11}$ (shown clearly in Fig. 6 of the drawings) and cause the lever $Q^8$ to tilt and through its connection with the rock-shaft Q cause the latter to rock.

Referring to Fig. 8 of the drawings will be observed a pawl $q$, pivotally mounted at $q'$ in the head $q^2$, which head is fastened to the rock-shaft Q. An angled portion of the pawl $q$ is adapted to engage one of the inclined cutting edges of the knife, and as the shaft Q is tilted said pawl, which is held in engagement with the inclined cutting edge of the knife by means of a spring $q^3$, will cause the knife to be moved forward a slight distance equal to the distance between the parallel portions of the cutting edge of the knife, as shown clearly in Fig. 8 of the drawings. Simultaneously with the feeding forward of the knife a stop $q^4$, a detail view of which is shown in Fig. 12 of the drawings, forming a gooseneck projecting from the angled plate $q^5$, is withdrawn from the knife. Said plate $q^5$ has arms, which are pivotally mounted upon pins $q^6$ in a plate $q^7$, which is fastened to the plate carrying the knife to be ground. The gooseneck-arm $q^4$ of said plate normally projects through an aperture in the knife-carrying plate and rests in the space intermediate the parallel cutting edges of the knife and is adapted to hold the latter to have true relation to the grinding-disk, as shown clearly in Fig. 8 of the drawings, and the mechanism for withdrawing said stop from the position shown in Fig. 8 consists of a plate $q^9$, having arms $q^{10}$, which are pivotally mounted upon the pivotal pins which carry the plate $q^5$. Said plate $q^9$ has an arm $q^{11}$ projecting therefrom, the head $q^{12}$ of which having its opposite faces parallel and at angles to the length of the arm $q^{11}$, as shown in Fig. 11 of the drawings, whereby as the pin $Q^{13}$ is moved backward and forward by the reciprocating movement imparted to the rod $Q^6$ said pin will contact with the inner face of the head $q^{12}$ upon the outer throw of the rod $q^6$, which will cause the arm $q^{11}$ to tilt, and as the latter tilts the plate $q^5$ will tilt upon its pivotal bearings by reason of the grooved portion $q^{15}$ of the plate $q^9$ bearing against a pin $q^{14}$ upon an arm of the stop $q^4$, and the latter will be thrown out of a space intermediate the parallel portions of the cutting edge of the knife and allow the pawl $q$ to feed the knife forward a short distance. After the knife has been fed forward the pawl $q$ will turn idly from a corrugation upon the side of the knife, and a spring R, shown in Figs. 8 and 10 of the drawings and which is fastened to the plate $q^7$, will return the stop $q^4$ to its normal position to hold the knife as the same is being ground.

In order to throw the feeding mechanism of the knife out of or into gear, I provide a pivotal bar $R^2$, (shown clearly in Figs. 2 and 4 of the drawings,) said bar being pivoted at its inner end at $R^3$ upon the cross-bar $Q^{10}$, as shown in the drawings. A bar $R^4$ is pivotally mounted at one end of the frame of the apparatus and has upon its under edge a shoulder $R^6$, which is designed to be thrown into the path of the tilting lever $Q^8$ to prevent the feeding of the knife. The lower edge of the pivotal bar $R^4$ has an inclined surface $R^5$, against which the upper surface of the lever $R^2$ is adapted to contact when it is desired to raise the lever $R^4$ so that the shoulder $R^6$ thereof will be raised above the tilting lever $Q^8$ to allow the knife-feeding mechanism to be actuated.

Referring to Fig. 7 of the drawings will be seen the mechanism for keeping the edge of the grinding-disk $D^8$ true in order to grind perfectly the irregular-outlined cutting edge of the knife. In said view, S S designate two angled members, which are pivotally mounted upon pins $S'$, which are supported by a plate $S^{4\times}$, which is adjustably mounted upon the yoke D, and the inner arm of each of said members is adapted to carry a diamond $S^2$. To the outer arm of each of said members S is pivotally connected a rod $S^3$, (shown clearly in the top plan view of the drawings,) the outer end of said rod $S^3$ being fastened to an arm $S^4$, thus holding the members S stationary while the yoke carrying the grinding-disk rocks, which will bring alternately first one diamond against one edge of the grinding-disk and then the other, thus affording means for keeping the grinding-disk cut down to a true edge. Said plate $S^4$, which has a recess formed therein, as illustrated in Fig. 7 of the drawings, has a series of rack-teeth $S^5$ upon one edge thereof, which are in mesh with the teeth of a pinion $S^6$, which is journaled to a stub-shaft $S^7$. T designates a gear-wheel having teeth upon the circumference thereof, and said wheel T, which is keyed to the shaft $S^7$, is adapted to mesh with a worm $T'$, mounted in a yoke $T^2$, which is pivotally mounted upon the yoke D and provided with a handle $T^3$. To the end of the shaft upon which the worm $T'$ is mounted is fixed a gear-wheel $T^4$, which is adapted to be thrown into mesh with a pinion $T^5$, mounted upon a shaft $T^6$, which latter also carries a ratchet-wheel $T^8$, which is adapted to be engaged by a resilient pawl $T^9$. W designates a dog which is pivotally mounted upon a pin $W'$, carried by the ears $W^2$, which are supported by the frame of the apparatus, and the shouldered portion of said dog is adapted to engage the teeth of said ratchet-wheel, and as the side of the yoke D to which said resilient pawl $T^9$ is fixed tilts up one of the teeth of said ratchet-wheel coming against the dog W will cause a partial rotary movement to be imparted to said ratchet-wheel and a reverse motion of said ratchet-wheel is prevented by said resilient pawl $T^9$. By the provision of the feeding means and the plate carrying said members S it will be observed that the cutting down and truing the edge of the grinding-disk may be regulated, and when it is desired to throw the mechanism out of gear the lever $T^3$ may be swung toward the cutting-disk and the feeding mechanism will be thrown out of gear.

In operation the knife is inserted between the plate $Q^2$ and the plate through which the feeding-pawl $q$ passes, and motion being imparted to the apparatus the grinding-disk will be rotated rapidly and as the cylinder rotates the lug carried by the arm $E^4$ will cause the yoke carrying the grinding-disk to tilt first in one direction, which will throw the disk at an angle to cut the proper bevel upon one of the parallel cutting edges of the knife as the plate carrying the table is tilted forward against the rapidly-rotating disk. The tilting forward toward the grinding-disk of the knife will continue until the entire edge of the parallel cutting edges is sharpened, after which the grinding-disk will, through the cam action and its connections with the cylinder, tilt to a vertical position and in so doing will grind one of the inclined edges of the blade, after which the grinding-disk, tilting in the opposite direction, will grind the opposite parallel cutting edge, as the knife is tilted toward the grinding-disk by means of the cam member $N^5$ actuating the arm $N^2$ of the disk $N'$, causing the arm N to come into contact with the shoulder upon the bar M and through its connections with the knife-carrying plate will cause the latter to tilt toward the grinding-disk at the proper predetermined moment. After the arm $N^4$ of the cam member $N^5$ passes the end of the arm $N^2$, Fig. 3 of the drawings, the spring which is mounted in the chambered portion of the shaft $N^6$ will cause the latter to return to its normal position, and the spring $L^2$ will cause the bar M to return to its normal position and also the plate carrying the knife. As the knife is tilted forward in cutting the second parallel edge of the knife the disk is again brought to a vertical plane, and in so doing will cut the second inclined edge intermediate the two parallel cutting edges, and the apparatus is actuated to feed the knife forward by means of the lug $e'$ coming in contact with the end of the lever, which, through its connections, will cause the shaft Q to rock and the pin carried on the crank-arm $Q^3$ fixed to said rock-shaft to throw the stop-pawl $q^4$ out of engagement with the knife simultaneously with the moving of the knife forward one step by means of the pawl $q$ pushing against the inclined edge of the cutting-knife. Said knife having been fed forward, the operation is repeated until the entire edge of the knife has been sharpened.

By the provision of the hand-wheel $G^3$ it will be noted that the yoke carrying the grinding-disk may be raised and lowered to regulate the grinding of the parallel portions of the cutting edge of the invention independent of the adjusting means for tilting the knife-holding apparatus, which latter is regulated by means of the hand-wheel J² to adjust the knife, so that the angled portions of the cutting edge may be properly ground.

While the knife is being ground, the grinding-disk is kept true by means of the two diamonds, which are thrown first against one side of the cutting edge and then on the opposite side, said members being automatically fed forward, and adapt the same for use in operation against the disk as the same decreases in diameter under usage by being worn down.

When it is desired to throw the feeding apparatus out of gear, so that the knife will not be tilted forward, the same may be accomplished by simply pushing in on the pawl $q$, which will allow the bar M to fall out of the path of the swinging arm N of the cam N'. If it is desired for any purpose to throw the feeding of the knife out of gear, the same may be accomplished by swinging the lever R² to the right, which will allow the pivotal lever R⁴ to fall into the position, so that the shoulder R⁶ will form a stop and prevent the outer tilting movement of the lever Q⁸, which actuates the feeding mechanism of the knife.

When it is desired to remove the grinding-disk and replace the same with a new one, the same may be easily and quickly accomplished by simply removing the nut D from the threaded screw D⁴, (shown in Fig. 7 of the drawings,) allowing the screw to be partially withdrawn and a new disk inserted between the shells D³, through which disk and shells the screw may be again replaced without the necessity of removing the shells from their bearings in the yoke.

From the foregoing it will be noted that a simple and efficient apparatus is provided for automatically sharpening beet-shredding knives, the essential features of the apparatus being independently adjustable, whereby the grinding of the edges may be regulated to a nicety and the grinding-disk kept at all times in such shape as to grind a true edge.

While I have shown a particular form of apparatus illustrating the features of my invention, it will be understood that the same may be varied in different ways, if desired, without in any way departing from the spirit of the invention.

Having thus fully described my invention, what I claim as new, and desire to secure by Letters Patent, is—

1. An apparatus for automatically grinding beet-shredding knives, comprising a rotatable tilting grinding-disk and means for operating the same, a tilting knife-support upon which a knife is held and independent adjusting mechanism for raising and lowering the grinding-disk and tilting the knife-support, as set forth.

2. An apparatus for automatically grinding beet-shredding knives, comprising a rotatable tilting grinding-disk and means for operating the same, a tilting knife-support upon which a knife is held, independent adjusting mechanism for raising and lowering the grinding-disk, and automatic means for feeding the knife, as set forth.

3. An apparatus for automatically grinding beet-shredding knives, comprising a rotatable tilting grinding-disk, means for adjusting said disk, a tilting knife-support, means for adjusting said support independent of the disk-adjusting means, and means carried by said support for feeding the knife and holding the same while it is being sharpened, as set forth.

4. An apparatus for automatically grinding beet-shredding knives, comprising an adjustable yoke, a rotatable tilting grinding-disk carried by said yoke, means for tilting said disk while in rotation, a tilting knife-support and means for operating the same, and automatic means for feeding a knife, as set forth.

5. An apparatus for automatically grinding beet-shredding knives, comprising an adjustable yoke, a grinding-disk-carrying yoke, having an axial bearing upon said adjustable yoke, a knife-support, means for adjusting the latter, mechanism for tilting said knife-support, and means for feeding a knife, as set forth.

6. An apparatus for automatically grinding beet-shredding knives, comprising an adjustable yoke, a shaft supported by said yoke, a rotatable grinding-disk-supporting yoke pivotally mounted upon said shaft, means for tilting said disk-carrying yoke, a knife-support, means for tilting the latter, adjusting means for regulating the knife-support, and means for feeding a knife upon said support, as set forth.

7. An apparatus for automatically grinding beet shredding knives, comprising an adjustable yoke, a shaft supported thereby, a rotatable grinding-disk-supporting yoke pivotally mounted upon said shaft, a rotatable cylinder having a cam-groove therein, an arm connected with said adjustable yoke, and having a lug adapted to travel in said cam-groove, whereby said disk may be tilted as it rotates, a tilting knife-support, means for adjusting said support, and mechanism for automatically feeding a knife upon said support, as set forth.

8. An apparatus for automatically grinding beet-shredding knives, comprising a yoke, means for tilting said yoke, a shaft carried by the latter, a rotatable grinding-disk-carrying yoke pivotally mounted at the ends of said shaft, a rotatable cylinder with a cam-groove therein, a lever having a bifurcated end, the arms of which are connected to said disk-carrying yoke, and a projection from said lever adapted to travel in said cam-groove, a tilting knife-support, means for adjusting the latter, and mechanism for feeding a knife upon said support, as set forth.

9. An apparatus for automatically grinding beet-shredding knives, comprising a yoke, means for tilting said yoke, a shaft carried by the latter, a rotatable grinding-disk-carrying yoke pivotally mounted at the ends of said shaft, a rotatable cylinder with a cam-groove therein, a lever having a bifurcated end, the arms of which are connected to said disk-carrying yoke, and a projection from said lever adapted to travel in said cam-groove, a tilting knife-support, means for adjusting the latter, a rock-shaft mounted upon the knife-support, a pawl carried by said rock-shaft and adapted to engage a knife to feed the same forward, as set forth.

10. An apparatus for automatically grinding beet-shredding knives, comprising a yoke, means for tilting said yoke, a shaft carried by the latter, a rotatable grinding-disk-carrying yoke pivotally mounted at the ends of said shaft, a rotatable cylinder with a cam-groove therein, a lever having a bifurcated end, the arms of which are connected to said disk-carrying yoke, and a projection from said lever adapted to travel in said cam-groove, a tilting knife-support, means for adjusting the latter, a rock-shaft mounted upon the knife-support, a pawl carried by said rock-shaft and adapted to engage a knife to feed the same forward, a stop adapted to engage one of the corrugations of the knife to hold the same while the latter is being sharpened, and means for releasing said stop and actuating said feeding-pawl, as set forth.

11. An apparatus for automatically grinding beet-shredding knives, comprising a yoke, means for tilting said yoke, a shaft carried by the latter, a rotatable grinding-disk-carrying yoke pivotally mounted at the ends of said shaft, a rotatable cylinder with a cam-groove therein, a lever having a bifurcated end, the arms of which are connected to said disk-carrying yoke, and a projection from said lever adapted to travel in said cam-groove, a tilting knife-support, means for adjusting the latter, a rock-shaft mounted upon said support, a pawl carried by said rock-shaft and adapted to feed the knife forward as the shaft is rocked, an arm keyed to said rock-shaft, means for rocking said arm, a pivotal stop engaging one of the corrugations of a knife, and means for releasing said stop as the shaft is rocked, as set forth.

12. In an apparatus for grinding beet-shredding knives, the combination with a rotatable tilting grinding-disk, means for raising and lowering the same, a tilting knife-support, means for moving said support toward the grinding-disk, a rock-shaft carried by said support, a pawl fixed to said rock-shaft and adapted to engage a corrugation of a knife upon the support to feed the same forward, an arm fixed to said rock-shaft, a spring-pressed stop adapted to engage a corrugation upon the inner face of a knife to hold the same while it is being ground, a pin carried by said arm, a stop-releasing arm adapted to be actuated by said pin, whereby said stop may be withdrawn from the knife, and means for rocking said shaft, as set forth.

13. In an apparatus for grinding beet-shredding knives, the combination with a rotatable tilting grinding-disk, means for raising and lowering the same, a tilting knife-support, means for moving said support toward the grinding-disk, a rock-shaft carried by said support, a pawl fixed to said rock-shaft and adapted to engage a corrugation of a knife upon the support to feed the same forward, an arm fixed to said rock-shaft, a spring-pressed stop adapted to engage a corrugation upon the inner face of a knife to hold the same while it is being ground, a projection upon the arms of said stop, a pivotally-mounted plate adapted to contact with said projection upon the arm of the stop to throw the stop away from the knife, a pin carried by the arm fixed to the rock-shaft and adapted to contact with the inclined portion of said plate, and means for tilting said plate, as set forth.

14. In an apparatus for grinding beet-shredding knives, the combination with a rotatable tilting grinding-disk, means for raising and lowering the same, a tilting knife-support, means for moving said support toward the grinding-disk, a rock-shaft carried by said support, a pawl fixed to said rock-shaft and adapted to engage a corrugation of a knife upon the support to feed the same forward, an arm fixed to said rock-shaft, a spring-pressed stop adapted to engage a corrugation upon the inner face of a knife to hold the same while it is being ground, a projection upon the arm of said stop, a pivotally-mounted plate adapted to contact with said projection upon the arm of the stop to throw the stop away from the knife, a pin carried by the arm fixed to the rock-shaft and adapted to contact with the inclined portion of said plate, said plate having an arm and means for tilting said arm whereby the knife will be fed forward and said stop actuated, as set forth.

15. In an apparatus for grinding beet-shredding knives, the combination with a rotatable tilting grinding-disk, means for raising and lowering the same, a tilting knife-support, means for moving said support toward the grinding-disk, a rock-shaft carried by said support, a pawl fixed to said rock-shaft and adapted to engage a corrugation of a knife upon the support to feed the same forward, an arm fixed to said rock-shaft, a stop, the shank portion of which is pivotally mounted upon the frame of the apparatus, a pin projecting from the arm carrying said stop, a plate pivotally mounted upon the shank portion of said stop, and having a recess in one face thereof, in which said pin is adapted to seat, a projecting arm of said stop having a portion thereof bent to form an inclined surface, a pin upon the arm which is fastened to said rock-shaft, and adapted to incline with said inclined portion of the plate, a tilting lever, means for operating the same, and connections between said lever and arm of the rock-shaft, whereby a knife-feeding pawl may be actuated simultaneously with the releasing of said stop, as set forth.

16. In an apparatus for grinding beet-shredding knives, the combination with a rotatable tilting grinding-disk, means for raising and lowering the same, a tilting knife-support, means for moving said support toward the grinding-disk, a knife-feeding mechanism, a pivotal lever for actuating said feeding mechanism, a pivotal bar for preventing said lever from tilting, and means for raising said bar out of the path of the lever, as set forth.

17. In an apparatus for grinding beet-shredding knives, the combination with a rotatable tilting grinding-disk, means for raising and lowering the same, a tilting knife-support, means for moving said support toward the grinding-disk, a rock-shaft, a knife-feeding pawl actuated thereby, a crank-arm secured to said rock-shaft, a rotatable cylinder, a projection thereon, a tilting lever actuated by said projection, a rod pivotally connected to said crank-arm, and lever connections between said rod and said pivotal lever which is actuated by said projection of said cylinder, as set forth.

18. In an apparatus for grinding beet-shredding knives, the combination with a rotatable tilting grinding-disk, means for raising and lowering the same, a tilting knife-support, means for moving said support toward the grinding-disk, a rock-shaft, a knife-feeding pawl actuated thereby, a crank-arm secured to said rock-shaft, a rotatable cylinder, a projection thereon, a tilting lever actuated by said projection, a rod pivotally connected to said crank-arm, lever connections between said rod and said pivotal lever, which is actuated by said projection of said cylinder, a pivotal bar having a shoulder on one face thereof, adapted to limit the throw of said pivotal lever, and means for raising said bar out of the path of the lever, as set forth.

19. In an apparatus for grinding beet-shredding knives, the combination with a rotatable tilting grinding-disk, means for raising and lowering the same, a tilting knife-support, means for feeding a knife upon said support, a rotatable cam, a spring-actuated rock-shaft, a disk fixed to said shaft and having arms projecting therefrom, a spring-pressed lever secured to said knife-support, and means connected to said spring-pressed lever and actuated by an arm of said disk as the other of said arms is actuated by said cam, whereby the knife-support may be tilted, as set forth.

20. In an apparatus for grinding beet-shredding knives, the combination with a rotatable tilting grinding-disk, means for raising and lowering the same, a tilting knife-support, means for feeding a knife upon said support, a rotatable cam, a spring-actuated rock-shaft, a disk fixed to said shaft and having arms projecting therefrom, a spring-pressed lever secured to said knife-support, a bar pivoted to said lever and having a shoulder upon the face thereof adapted to be engaged by one of said arms, and the other arm adapted to be actuated by said cam member, and means for raising said bar into the path of the arm which actuates it, as set forth.

21. In an apparatus for grinding beet-shredding knives, the combination with a rotatable tilting grinding-disk, means for raising and lowering the same, a tilting knife-support, means for feeding a knife upon said support, a rotatable cam, a spring-actuated rock-shaft, a disk fixed to said shaft and having arms projecting therefrom, a spring-pressed lever secured to said knife-support, a bar pivoted to said lever and having a shoulder upon the face thereof adapted to be engaged by one of said arms, and the other arm adapted to be actuated by said cam member, a spring-pressed finger, a pin carried thereby and working in a slot in the under side of said bar, and means for raising the bar into the path of said arm, as set forth.

22. In combination with an apparatus for sharpening beet-shredding knives, a yoke pivotally mounted in the frame of the apparatus, a rotatable sharpening-disk carried by said yoke, means for tilting said disk, a knife-support and means for tilting the same, a swiveled thimble mounted in the frame of the apparatus, a wheel fixed to said thimble, a threaded shaft passing through said thimble and engaging the threads therein, and a bar pivotally connected to said shaft and fastened to said yoke, as set forth.

23. The combination in an apparatus for sharpening a beet-shredding knife, comprising a rotatable and tilting grinding-disk, means for raising and lowering said disk, a pivotal rack, a knife-support mounted thereon, a shaft supported in the frame of the apparatus and having a threaded aperture therein, a threaded screw swiveled upon said rack and having connection with the threaded aperture of said shaft, and a hand-wheel secured to said screw, as set forth.

24. The combination in an apparatus for sharpening a beet-shredding knife, comprising a rotatable and tilting grinding-disk, means for raising and lowering said disk, a pivotal rack, a tilting knife-support mounted thereon, a pivotal spring-pressed lever secured to said knife-support, a screw fastened to said lever, an arm projecting from said knife-support, a spring-bar upon said screw, and bearing yieldingly against said arm, a thumb-nut mounted upon said screw, means for tilting said spring-pressed lever and means for adjusting said rack, as set forth.

25. In combination with an apparatus for sharpening beet-shredding knives, a rotatable grinding-disk and means for tilting the same, an adjustable knife-holder, means for feeding a knife thereon, a rotatable cam, a chambered shaft, a spring fixed at its inner end to the bottom of the chambered portion of said shaft, a gudgeon keyed in the other end of the chambered portion of the shaft to which said spring is fastened, a disk fixed to said shaft, arms projecting from said disk, one of which is adapted to be actuated by said cam, and means actuated by the other of said arms for tilting said knife-support, as set forth.

26. In combination with a tilting yoke, a rotatable disk mounted thereon, means for tilting said yoke, rack-teeth upon said yoke, a pinion-wheel in mesh with said teeth, a worm-wheel rotating with said pinion, a worm-shaft, a yoke carrying said worm-shaft, a handle upon said worm-carrying yoke, a pinion-wheel rotating with said worm-shaft, a ratchet-wheel in mesh with said gear-wheel, a resilient stop engaging the teeth of said ratchet-wheel, a pivotal pawl against which the teeth of said ratchet-wheel are adapted to contact as the yoke carrying the grinding-disk tilts, as set forth.

27. In combination with a tilting yoke, a rotatable disk mounted thereon, means for tilting said yoke, rack-teeth upon said yoke, a pinion-wheel in mesh with said teeth, a worm-wheel rotating with said pinion, a worm-shaft, a yoke carrying said worm-shaft, a handle upon said worm-carrying yoke, a pinion-wheel rotating with said worm-shaft, a ratchet-wheel in mesh with said gear-wheel, a resilient stop engaging the teeth of said ratchet-wheel, a pivotal pawl against which the teeth of said ratchet-wheel are adapted to contact as the yoke carrying the grinding-disk tilts, and means for holding said members as the yoke carrying the same rocks, as set forth.

28. An apparatus for automatically grinding beet-shredding knives, comprising a tilting grinding-disk, means for adjusting the same, a knife-support and mechanism for adjusting the same, means for feeding the knife forward, and mechanism for holding the knife in true relation to the grinding-disk, as set forth.

In testimony whereof I hereunto affix my signature in the presence of two witnesses.

JOSEPH A. STANSBURY.

Witnesses:
FRANKLIN H. HOUGH,
HESTER E. DRAYTON.